United States Patent [19]

Reese et al.

[11] Patent Number: 4,461,549
[45] Date of Patent: Jul. 24, 1984

[54] LINE ADJUSTING AND LOCKING DEVICE FOR EYEGLASSES

[75] Inventors: Donald M. Reese; Ida L. Reese, both of Palos Verdes, Calif.

[73] Assignee: Suspension Eyewear Enterprises, Newport Beach, Calif.

[21] Appl. No.: 384,247

[22] Filed: Jun. 2, 1982

[51] Int. Cl.³ ............................ G02C 5/14; G02C 5/22
[52] U.S. Cl. .................................. 351/153; 351/121; 16/228
[58] Field of Search ............... 351/111, 118, 121, 153; 16/228

[56] References Cited

U.S. PATENT DOCUMENTS 4,202,609  5/1980  Reese et al. ........................ 351/111

Primary Examiner—John K. Corbin
Assistant Examiner—Rodney Bovernick
Attorney, Agent, or Firm—Klein, Szekeres & Fischer

[57] ABSTRACT

A line adjusting and locking device is disclosed for adjusting and locking individual suspension lines of an eyeglass mounting assembly of the type which, instead of temple pieces, has a pair of flexible suspension lines attaching ear pieces of the glasses to the respective lenses. The adjusting and locking device includes a slotted member attached to each earpiece wherein a slot accommodates one pair of the suspension lines. After lengthwise adjustment of the individual lines, the lines are wrapped around the slotted member, preferably in a plurality of revolutions, and a locking cap member is press-fitted on the lines and the slotted member to lock the adjusting device.

22 Claims, 5 Drawing Figures

LINE ADJUSTING AND LOCKING DEVICE FOR EYEGLASSES

BACKGROUND OF THE INVENTION

1. Field of the Invention

The present invention is directed to a line adjusting and locking device used on a certain type of lens support system for eyeglasses. More particularly, the present invention is directed to an improved adjusting and line locking device adapted for use on eyeglasses of the type described in U.S. Pat. No. 4,202,609.

2. Brief Description of the Prior Art

Different kinds of frames or mountings for eyeglasses, sunglasses, safety glasses and the like are known in the prior art. Most conventional prior art frames or mountings include temple pieces which are hingedly attached to the transparent members (such as lenses, in case of eyeglasses, having optical refractory power) of the eyeglasses, sunglasses, safety glasses and the like.

U.S. Pat. No. 4,202,609 discloses a mounting or support assembly for eyeglasses, sunglasses, safety glasses and the like (hereinafter collectively referred to as eyeglasses) wherein instead of rigid temple pieces, the transparent members (hereinafter lenses) are attached to the respective earpieces by relatively thin flexible lines. More specifically, each lens of the eyeglasses described in U.S. Pat. No. 4,202,609 is attached to an earpiece by a pair of suspension lines which are spaced apart at their respective point of attachment to the lens, and converge to be attached to the earpiece substantially at the front thereof.

An important feature of the lens support assembly disclosed in said patent is that length of the lines is individually adjustable to precisely fit the mounting or support assembly to the person who wears the eyeglasses. Important advantages of the support assembly disclosed in said patent include its aesthetic appeal, light weight, capability for optimal adjustment to maximize comfort to the wearer, and ability of the support assembly to hold or return the lenses into optimal position relative to the wearer's face and eyes after an inadvertent dislocation.

In order to render the length of each suspension line individually adjustable, U.S. Pat. No. 4,202,609 specifically discloses a line adjusting and locking device which includes a locking plate attached to frontal ends of the earpieces by miniature screws.

An additional specific embodiment of an adjusting and locking device to be used in conjunction with the eyeglasses of the type shown in U.S. Pat. No. 4,202,609 is disclosed in International Application Published Under the Patent Cooperation Treaty on June 25, 1981; International Application No. PCT/US79/01106. The just-noted adjusting device, which substantially comprises a beaded body attached to the flexible lines, is also disclosed in copending United States Patent Application (U.S. application Ser. No. 384,248), and assigned to the same assignee as the present application.

There is still another line adjusting and locking device which, although not disclosed in any patent or patent application known to the present inventors, comprises further background to the present invention. This device includes a plurality of small holes disposed transversely in the frontal cylindrical end of each earpiece. Each of the flexible suspension lines is threaded into several (at least two) of the holes, and a retaining cap is thereafter press-fitted upon the cylindrical end of the earpiece.

Although the above summarized line adjusting and locking devices function well in conjunction with the eyeglasses of the type shown in U.S. Pat. No. 4,202,609, there is still room for improvement in this area of technology. Particularly, there is room for improvement for a line adjusting and locking device for use with the eyeglasses of the type shown in U.S. Pat. No. 4,202,609, which is readily adaptable for mass production, easy to adjust and mount, and yet securely holds the flexible suspension lines attached to the earpieces. The present invention provides this improvement.

SUMMARY OF THE INVENTION

It is an object of the present invention to provide an improved line adjusting and locking device for use in conjunction with lens support systems of the type disclosed in U.S. Pat. No. 4,202,609.

It is another object of the present invention to provide a line adjusting and locking device which is readily mass produceable.

It is still another object of the present invention to provide a line adjusting and locking device which is readily manipulated by an operator to adjust optimal length of flexible suspension lines associated with the adjusting device, and yet, once adjusted and locked, securely holds the lines in place in the adjusting device.

These and other objects and advantages are attained by an adjusting and locking device having a slotted member attached to an earpiece of a pair of eyeglasses, sunglasses, safety glasses and the like of the type wherein the earpieces are connected to transparent members by thin flexible suspension lines. A suitable hollow cap member has a specially contoured interior surface mountable upon the slotted member. A pair of the flexible lines is accommodated in the slot, wrapped around the slotted member in at least one revolution, and the cap member is press-fitted upon the slotted member to securely lock the flexible lines in place.

The features of the present invention can be best understood, together with further objects and advantages, by reference to the following description taken in connection with the drawings, wherein like numerals indicate like parts.

DESCRIPTION OF THE PREFERRED EMBODIMENT

The following specification taken in conjunction with the drawings set forth the preferred embodiment of the present invention. The embodiment of the invention disclosed herein is the best mode contemplated by the inventor for carrying out his invention in a commercial environment, although it should be understood that various modifications can be accomplished within the parameters of the present invention.

Figure 1:
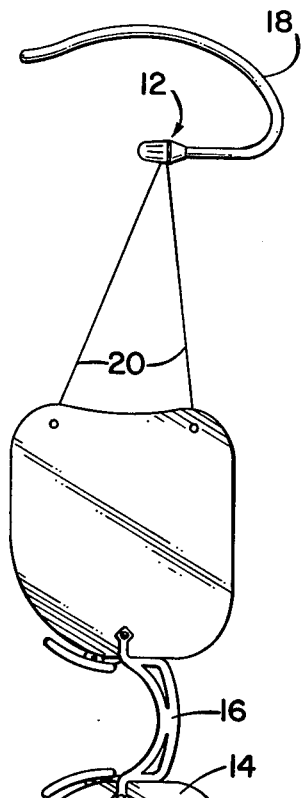
FIG. 1 is a perspective view of a pair of eyeglasses incorporating a preferred embodiment of the improved line adjusting and locking device of the present invention.

Referring now to the perspective view of FIG. 1, a pair of eyeglasses 10 is shown which incorporates the novel line adjusting and locking device 12 of the present invention. The eyeglasses 10 are of the type disclosed in U.S. Pat. No. 4,202,609. Thus, the eyeglasses 10, to which the present invention pertains as an improvement, include a pair of transparent members 14 attached to one another by a centerpiece 16 in a conventional manner. The eyeglasses 10 further include a pair of earpieces 18. The earpieces 18 are connected to the transparent members 14 by respective pairs of flexible lines 20 in such a manner that the length of each line 20 is individually adjustable to assure maximum physical and visual comfort to the wearer (not shown).

For further description of the eyeglasses 10, reference is made to U.S. Pat. No. 4,202,609, the specification of which is expressly incorporated herein.

Insofar as the invention disclosed in the above-noted patent specifically relates to the manner of mounting the eyeglasses 10 to a wearer (not shown), and the present invention relates to an improvement in said mounting or lens support assembly, the nature of the lenses or transparent members 14 of the eyeglasses 10 is not critical from the standpoint of the present invention. Thus, the eyeglasses 10 may be sunglasses (of no optical refractory power), safety glasses or the like. The term "eyeglasses" is hereinafter used for the sake of simplicity of expression, and in an exemplary rather than limiting manner. Similarly, the term "lens" or "lenses" is hereinafter interchangeably used with the term "transparent members" and for the purpose of the present description should be construed to include transparent members or lenses of eyeglasses, sunglasses, safety glasses and the like, with or without optical refractory power.

As an important feature of the present invention, each earpiece 18 has a frontal part or end 22 which forms part of the novel line adjusting and locking device 12. As it should be apparent fronm an inspection of FIG. 1, the frontal part 22 is disposed just slightly below and in front of ears (not shown) of the person (not shown) who wears the eyeglasses 10.

The frontal part 22 includes a slotted member 24. More specifically, the slotted member 24 comprises a substantially cylindrical portion 26 which is immediately adjacent to the earpiece 18. A pair of elongated prongs 28 protrude from the cylindrical portion 26 substantially axially relative to the cylindrical portion 26. The two prongs 28 define a slot 30. As is shown on the Figures, the slot 30 is capable of transversely accommodating a pair of the flexible suspension lines 20 which attach the earpiece 18 to the respective lens 14. In other words, the width of the slot 30 is sufficient to permit placement of a pair of suspension lines 20 into the slot 30 substantially transversely to the longitudinal axis of the prongs 28, and to permit lengthwise sliding motion of the lines 20 in the slot 30 with some friction. The prongs 28 also include a circumferentially placed rib 31, the function of which is discussed below in conjunction with the description of a cap or locking member 32.

Figure 2:
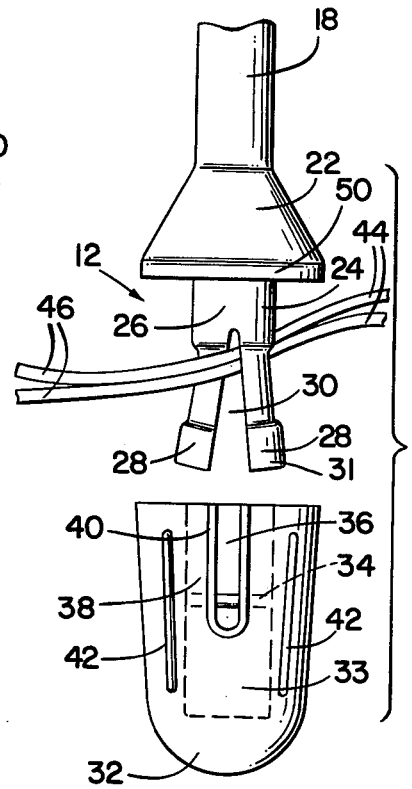
FIG. 2 is a partially exploded perspective view of the preferred embodiment of the line adjusting and locking device of the present invention, the view showing the device before a stage wherein length of a pair of suspension lines is being adjusted.

Thus, the cap or locking member 32, which on FIG. 2 is shown removed from the slotted member 24, is a substantially cylindrical, slightly tapered hollow body. It has an internal cavity 33 which is specifically adapted in configuration to be press-fitted on the slotted member 24. More specifically, the cap or locking member 32 includes an internal, circumferential rib 35 which is best shown on the cross-sectional views of FIGS. 3, 4 and 5.

The cap 32 further includes an opening or longitudinal slot 36 in a substantially cylindrical wall 38 of the hollow body of the cap 32. The opening 36 accommodates the suspension lines 20 in the assembled structure. A reinforcing rib 40 is disposed around the opening 36 which serves the purpose of preventing material failure of the relatively thin wall 38 of the cap 32. Finally, the cap 32 includes a plurality of outer, longitudinally disposed ribs 42 which serve the purpose of facilitating manipulation, and particularly rotation, of the cap 32 when the adjusting device 12 is assembled during fitting the eyeglasses 10 to a wearer (not shown).

For an appreciation of the true dimensions of the slotted member 24 and the cap 32, it is noted that both are shown on FIGS. 2, 3, 4 and 5 in greatly enlarged dimensions. On the other hand, FIG. 1 shows the assembled adjusting device 12 close to its true dimensions.

Further details and functions of the adjusting device 12 are disclosed below as the manner of adjusting the length of the lines 20 and locking the adjusting device 12 is disclosed.

Referring first to FIG. 2, the one pair of suspension lines 20 is shown disposed in the slotted member 24, with the cap member 32 removed. As it was stated above, the slotted member 24 is part of the earpiece 18, and the pair of lines 20 connect the earpiece 18 to the respective lens 14. Portions 44 of the lines 20 shown on the right side of FIG. 2 lead to the lens 14. Portions 46 of the lines 20 shown on the left side of FIG. 2 are loose portions 46 which are eventually removed as excess.

Figure 3:
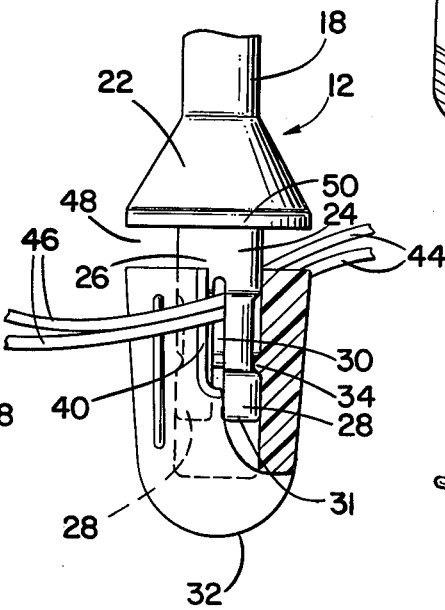
FIG. 3 is a perspective view of the preferred embodiment of the line adjusting and locking device, partly in cross-section, the view showing the device in the stage wherein the length of the suspension lines is adjusted.

After the lines 20 are placed into the slot 30 between the slightly diverging prongs 28, the cap 32 is placed on the slotted member 24 to occupy a first assembling position thereon, shown on FIG. 3. In the first position, the longitudinal opening 36 of the cap 32 is aligned with the loose portion 46 of the lines 20. Furthermore, the internal circumferential rib 34 of the cap member 32 engages the rib 31 of the prongs 28, as shown on FIGS. 3 and 4. Consequently the cap 32 is relatively securely held on the slotted member 24, and the loose portions 46 of the lines 20 are disposed in the longitudinal opening 36.

In the just-described first assembly position of the cap 32 on the slotted member 24, the lines 20 are capable of transversely sliding between the prongs 28 of the slotted member 24, however, with certain friction. To this end, the dimensions of the slot 30 and of the internal cavity 33 of the cap 32 are appropriately chosen relative to one another and relative to the thickness of the lines 20. Thus, in this position of the cap 32, the individual length of each line 20 is adjustable so as to provide optimal physical and visual comfort to the wearer (not shown) of the eyeglasses 10. In the first assembly position of the cap 32, a gap 48 between the cap 32 and adjacent enlarged end 50 of the earpiece 18 is approximately 1/16".

Figure 4:
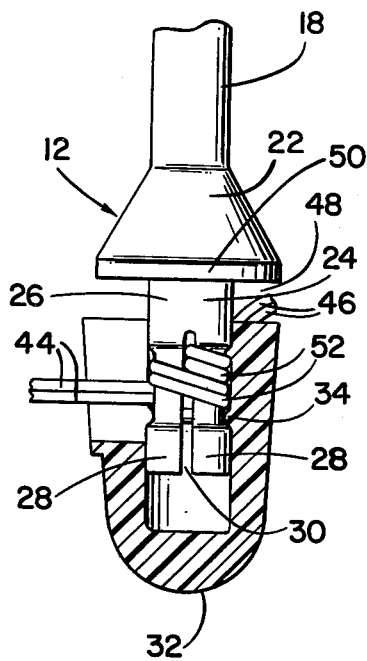
FIG. 4 is a perspective view of the preferred embodiment of the line adjusting and locking device of the present invention, partly in cross-section, the view showing the device in a stage wherein lines of adjusted length are being locked into position.

Referring now to FIG. 4, the lines 20 are shown wrapped several times around the prongs 28 of the slotted member 24 while disposed within the interior cavity 33 of the cap 32. This is accomplished by rotating the cap 32, preferably approximately one and one-half (1½) turns, preferably so that the longitudinal opening 36 initially moves towards the back of the earpiece 18. While the cap 32 is rotated, the loose portion 46 of the lines 20 is set in the longitudinal opening 36.

After the lines 20 are wrapped around the prongs 28, the loose, excess portion 46 of the lines is clipped off, as is schematically shown on FIG. 4. Thereafter, the cap 32 is rotated slightly further to align the longitudinal opening 36 with the remaining lines 20 leading to the lens 14. The lines 20 are then manually pulled down into the longitudinal opening 36. FIG. 4 depicts the adjusting device 12 in the just-described state; that is where the loose, excess portions 46 of the lines 20 had been removed, and the lines 20 leading to the lens 14 are disposed in the longitudinal opening 36 of the cap 32.

Figure 5:
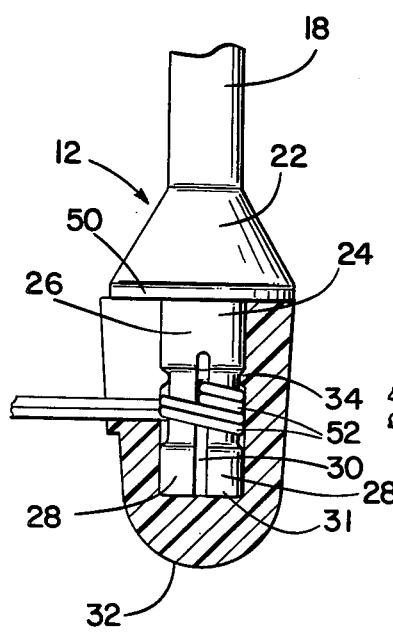
FIG. 5 is a perspective view of the preferred embodiment of the line adjusting and locking device of the present invention, partly in cross-section, the view showing the lines locked into position in the device.

Referring now to FIG. 5, the cap 32 is shown in a second, locked position on the slotted member 24. This is the position of the adjusting device 12 wherein the lines 20 are affixed to the earpieces 18, and the eyeglasses 10 are used. In the second, locked position of the cap 32 relative to the slotted member, the internal rib 34 engages wrapped revolutions 52 of the lines 20, and the cap 32 is securely held in place. Nevertheless, placement of the cap 32 on the slotted member 24 is essentially a press-fit, and when disassembly of the adjusting device 12 is required, the cap 32 is readily removed from its locking position.

In order to provide for the ready assembly and disassembly of the adjusting device 12 in the above-described manner, the slotted member 24 and the cap member 32 are both preferably made of plastic materials having some elastic property. Polycarbonate, especially transparent polycarbonate, is particularly preferred as material for the slotted member 24 and cap member 32, as well as for the entire earpiece 18. In the hereindescribed preferred embodiment, the earpiece 18 is integrally injection molded with the slotted member 24. The cap member 32 is also injection molded.

The several parts, such as the slotted member 24, the revolutions 52 of the lines and the specifically-designed interior 33 of the cap 32, cooperate or co-act with one another to enable the adjusting device 12 to function in the above-described manner.

Since several modifications of the hereinbefore disclosed line adjusting and locking device may become readily apparent to those skilled in the art in light of the above disclosure, the scope of the present invention should be interpreted solely from the following claims.

What is claimed is:

1. An adjusting and line locking device operatively associated with an earpiece member of a pair of eyeglasses, sunglasses, safety glasses and the like of the type having a pair of thin flexible lines which attach transparent members of the glasses to the earpieces, said device being adapted for adjustably attaching the lines to the earpiece member and comprising:
    a slotted member fixedly connected to the earpiece and having a slot adapted for transversely accommodating the flexible lines, and
    a locking member complementary to the slotted member and capable of being removably positioned on the slotted member, the locking member comprising means for substantially preventing movement of the flexible lines within the slot.

2. The adjusting device of claim 1 wherein the slotted member includes two prongs wherebetween the slot is disposed.

3. The adjusting device of claim 1 wherein the locking member includes a second slot on one side thereof, the second slot being capable of accommodating the lines when the locking member is assembled to the slotted member.

4. The adjusting device of claim 1 wherein the slotted member and the locking member jointly comprise means for holding the locking member on the slotted member in a first position wherein movement of the lines in the slot is permitted and for holding the locking member on the slotted member in a second position wherein movement of the lines within the slot is substantially prevented.

5. The adjusting device of claim 4 wherein the means for holding comprise a prong disposed on the slotted member and a rib disposed in the locking member.

6. The adjusting device of claim 5 wherein the means for holding comprise means for holding the locking member in said second position which includes a plurality of revolutions of the lines.

7. The adjusting device of claim 5 wherein the locking member includes a plurality of externally disposed ribs, said ribs being adapted for facilitating gripping and turning of the locking member by an operator.

8. The adjusting device of claim 7 wherein the slotted member and the locking member are made of polycarbonate plastic material.

9. The adjusting device of claim 1 wherein the slotted member is integrally constructed with the earpiece.

10. The adjusting device of claim 9 wherein the slotted member and the locking member are mde of plastic material.

11. The adjusting device of claim 10 wherein the slotted member and the locking member are made of polycarbonate material.

12. An adjusting and line locking device attached to an earpiece of a pair of eyeglasses, sunglasses, safety glasses and the like of the type wherein each earpiece is attached to transparent members of the glasses by a pair of thin flexible lines, the device comprising:
    a first member attached to the earpiece and having at least two prongs forming an elongated slot in the first member, the slot being dimensioned to be capable of transversely accommodating the pair of lines in frictional engagement therewith, and
    a hollow cap member removable from the first member and having an interior surface which is specifically contoured to be press-fittable to the first member, the cap member comprising means for substantially preventing movement of the lines in the slot when the cap member is fully mounted to the first member.

13. The adjusting device of claim 12 wherein the cap member and the first member jointly comprise means for holding the cap member in a first position on the first member, and for alternatively holding the cap member in a second position on the first member, the lines being capable of moving with friction in the slot in the first position, and the cap member being fully mounted to the first member in the second position.

14. The adjusting device of claim 13 wherein the means for holding comprise a rib disposed on an exterior surface of the first member and another rib disposed in an interior surface of the cap member.

15. The adjusting device of claim 13 wherein the first member and the cap member both are substantially axisymmetrical whereby the cap member is rotatable by an external force on the first member at least in its first position on the first member.

16. The adjusting device of claim 15 wherein the first member is integrally constructed with the earpiece.

17. The adjusting device of claim 16 wherein the first member and the cap member are made of plastic material.

18. The adjusting device of claim 17 wherein the first member and the cap member are made of polycarbonate plastic material.

19. In a pair of eyeglasses, sunglasses, safety glasses and the like having a pair of transparent members fixedly attached to one another, a pair of earpieces and a pair of thin flexible lines attaching each transparent member to the earpieces, the improvement comprising:

a frontal end of each earpiece having at least two elongated prongs with a slot being disposed between the prongs, said slot being dimensioned so that the pair of lines are transversely accommodated in the slot, said lines being wrapped around the prongs in at least one revolution, and hollow cap means having an interior surface specifically contoured to be press-fitted onto the prongs having said revolutions, said cap means being adapted for locking said lines onto said end of each earpiece, the cap means being removable from the end of the earpiece.

20. The improvement of claim 19 wherein the cap means include an opening on the side thereof, said opening accommodating the lines leading from the end of the earpiece to the transparent members.

21. The improvement of claim 20 wherein the earpiece, including said end thereof, and the cap means are made of plastic material.

22. The improvement of claim 21 wherein the plastic material is polycarbonate.

* * * * *